March 7, 1933. O. WITTEL 1,900,876
MOTION PICTURE FILM FEEDING DEVICE
Filed Oct. 9, 1930

Inventor,
Otto Wittel,

Patented Mar. 7, 1933

1,900,876

UNITED STATES PATENT OFFICE

OTTO WITTEL, OF ROCHESTER, NEW YORK, ASSIGNOR TO EASTMAN KODAK COMPANY, OF ROCHESTER, NEW YORK, A CORPORATION OF NEW YORK

MOTION PICTURE FILM FEEDING DEVICE

Application filed October 9, 1930. Serial No. 487,412.

This invention relates to film actuating mechanism in motion picture apparatus and more particularly to a mechanism of the claw type which advances the film through the apparatus without vibration and which advances the film a definite amount during each cycle in either direction.

In film actuating mechanism of the type generally used the claw has a relative motion while in contact with the edges of the film perforations during entry of the claw and especially during exit of the claw from the film perforations. The result of such relative motion is a scraping of the claw along the edges of the film perforations thereby causing vibration of the film and blurring of the image. Also, heretofore, it has not been possible to reverse the direction of motion of the film without reframing except under very special circumstances.

The objects of the present invention are to provide a film actuating mechanism of the claw type wherein the claw has no relative movement while in contact with edges of the film perforations during entry and exit of said claw, wherein the movement of the claw is such that the film is moved a definite amount during each cycle irrespective of the direction of film motion or reversal thereof, and which can be readily manufactured and used.

The above objects are realized in a claw type actuating mechanism which comprises an arm having a claw which is moved into and out of engagement with the film perforations and in which the arm is simultaneously actuated by a cam having portions so that the claw describes a path similar to a figure 8.

The claw type film actuating mechanism of the present invention is more fully described hereinafter with respect to the accompanying drawing wherein the same reference letters designated similar elements and wherein.

Figure 1:
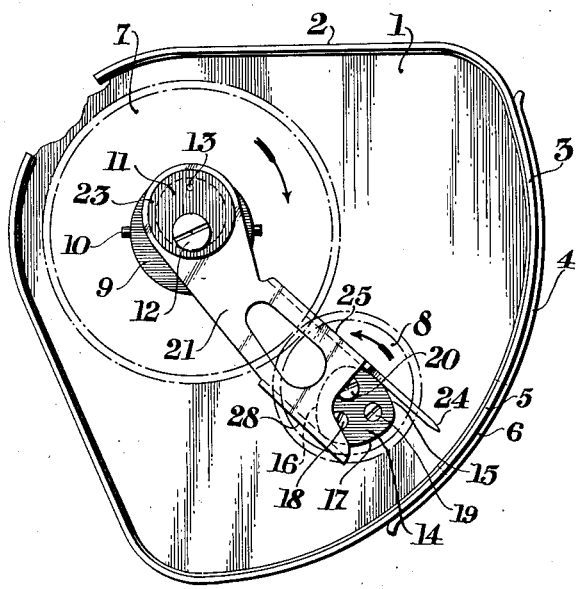
Fig. 1 is a side elevation of the actuating mechanism according to the invention.

Since the actuating mechanism of this invention may be used in any type of motion picture apparatus, all of which are well known, only the actuating mechanism as used in a projector has been illustrated and its installation in or adaptation to any other apparatus will be quite obvious to those skilled in the motion picture art.

The standard 1 of the projector has attached thereto a casing 2, the front portion of said casing 2 constituting an arcuate film guideway 3. An arcuate shoe 4 is resiliently held against said film guideway 3 in a known manner and so that a motion picture film may be advanced therebetween.

Pairs of slots 5 and 6 are provided longitudinally of the guideway 3 and shoe 4 and spaced so as to index with the perforations in the film strip and with each other.

A pinion gear 7 is rotatably mounted in said standard 1 and inter-engages a smaller pinion gear 8 also rotatably mounted in said standard 1. Driving means, not shown, preferably rotate gear 7 which has a diameter twice as great as that of gear 8, so that the ratio of gear 7 to gear 8 is as 2 is to 1.

A stud 9 is positioned concentrically to gear 7 by means of a pin 10 while a cam 11 having an over-hanging portion is eccentrically positioned on stud 9 by a bolt 12 and a pin 13.

A cam 14 having three arcuate equiangular portions 15, 16 and 17 and of the type known as a "Lumiere cam" is eccentrically mounted on the smaller pinion gear 8 by means of bolts 18 and 19 to rotate about a stud bolt 20 on the axis of gear 8.

Figures 2, 3:
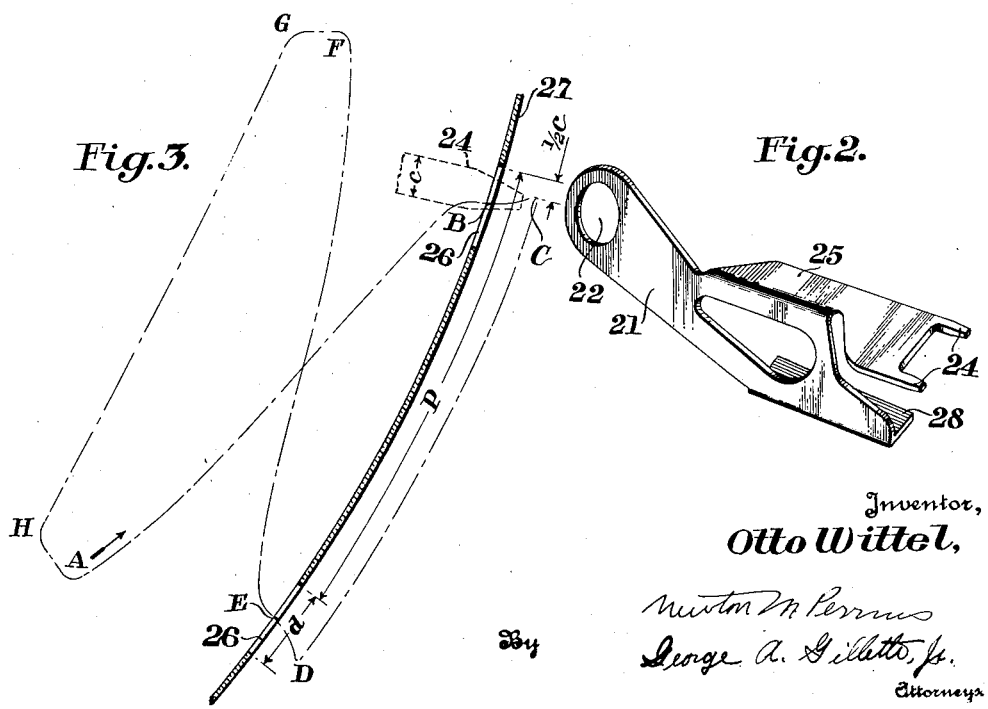
Fig. 2 is a detail perspective view of the arm having a claw for engaging the film perforations.
Fig. 3 is a diagrammatic illustration of the path of the claw with respect to the film during a complete cycle.

An arm 21 is provided with a hole 22, see Fig. 2, to receive the cam 11 and is rotatably held in place by the over-hanging portion 23 of said cam 11. Tapering claws 24 are integral with a flanged portion 25 of arm 21 and have thicknesses less than the longitudinal dimension of perforations 26 in film 27, see Fig. 3. The arm 21 also has a lower flanged portion 28 integral therewith.

By virtue of the eccentric motion of cam 11 and the motion imparted intermediately through sliding engagement of cam 14 with flanged portions 25 and 28, the arm 21 is given such a motion that the claws 24 describe the path shown in Fig. 3.

In the position of the cams 11 and 14 shown in Fig. 1 the claw 24 is at the point A of the path, see Fig. 3. Upon rotation of gear 7 in the direction of the arrow in Fig. 1, the claw 24 moves in the direction of the arrow in Fig. 3 from A to B, having received its movement toward film 27 from cam 11 and its upward movement from cam 14. The claw 24 enters film perforation 26 at the center thereof thus permitting the use of claws having any thickness less than the perforation dimension, with a corresponding change in the position of the film with respect to the axes of the gears.

The rear of arcuate portion 17 of cam 14 now imparts an upward movement to the claw while cam 11 still moves the claw into the film perforation 26 until the center of the claw 24 is at C and the upper edge of the claw just abuts the upper edge of film perforation 26.

The arm 21 rocks on portion 16 of cam 14 which is now moving downward about bolt 20 and the end of arm 21 is moved by cam 11 so that claw 24 moves along the line C D, a distance equal to the film pitch P plus the size of a perforation $d$ less two half thicknesses $\frac{1}{2}c$, or one whole thickness $c$, of the claw 24. The actual movement of the film, however, is only that of the film pitch since the claw 24 does not abut the lower edge of the film perforation until said claw has moved the distance $d-c$. This non-actuating movement of the claw 24 is vitally necessary for reversal of film motion without reframing as will be hereinafter developed.

The rear of arcuate portion 16 of cam 14 together with the movement of cam 11 now retracts the claw 24 from perforation 26 along the line D E so that the claw 24 makes exit from said film perforation 26 at the center thereof.

The claw path E F G H A is completed upon a 360° rotation of cam 11 and a 720° rotation of cam 14, thus completing one cycle of claw movement. Continued rotation of the cams and gears in the same direction will, of course, cause the claw to move over the path just described, and it is also evident that rotation in the reverse direction will not change the path of the claw.

In known apparatus, when the direction of rotation is changed to reverse the direction of film movement, it is necessary to reframe the film because the movement of the claw in the path of the film is only equal to the film pitch and the non-actuating movement of the claw, since the claw upon reversal enters the film perforation adjacent the lower edge thereof is subtracted from its length of movement so that the reverse movement of the film during the first cycle is only $P-(d-c)$. Thus a framing difference of $(d-c)$ will exist throughout the reverse run of the film. However according to the present invention, since the claw path in the direction of film movement is $P+d-c$ in length, the subtraction of the non-actuating movement of the claw $(d-c)$, still leaves an actuating movement of the claw equal to the pitch of the film. The path, it is to be noted, is symmetrical and the action of the claw on the film is identical in the two directions.

The construction of the present invention embodies all of the advantages of previously known skip stroke film actuating mechanisms with the additional advantages of eliminating the scraping of the claw on the film edges and permitting reversal of film direction without reframing. The utility of the last mentioned advantage may not be obvious but it has been observed that occasion often arises during domestic projection, especially for children, to run the film through the projector backwards.

Changes in gear ratios, alterations of the shape of the arm and claws, equivalent means for eccentrically moving one end of the arm and other obvious changes are deemed to be within the scope of my invention as defined in the following claims.

Having now particularly described my invention, what I desire to protect by Letters Patent of the United States and what I claim is:

1. In a motion picture apparatus, a film guideway, film actuating mechanism having a definite cycle of movement and comprising an arm having a claw which during a portion of the cycle traverses the guideway to engage and move a film therein, actuating means moving one end of said arm, and a second actuating means adjacent to said arm for imparting to the claw a component motion opposite in direction to the motion of the film at intervals during entry into and exit from the perforations in said film whereby relative motion of the claw in contact with the film is prevented.

2. In a motion picture apparatus, a film guideway, film actuating mechanism having a definite cycle of movement and comprising an arm having a claw which during a portion of the cycle traverses the guideway to engage and move a film therein, actuating means moving one end of said arm, and a second actuating means imparting to said claw a component motion opposite in direction to the film movement during entry into the perforations in said film whereby scraping of the claw along the edges of the film is prevented.

3. In a motion picture apparatus, a film guideway, film actuating mechanism having a definite cycle of movement and comprising an arm having a claw which during a portion of the cycle traverses the guideway to engage and move a film therein, actuating means moving one end of said arm, and a second actuating means imparting to said claw a component motion opposite in direction to the film movement during exit from the perforations in said film whereby scraping of the claw along the edges of the film is prevented.

4. In a motion picture apparatus, a film guideway, film actuating mechanism having a definite cycle of movement and comprising an arm having a claw which during a portion of the cycle traverses the guideway to engage and move a film therein, actuating means moving one end of said arm, and a second actuating means engaging said arm, and imparting to said claw a component motion in the direction of motion of the film, the path of said claw parallel to the film during each cycle being equal in length to the pitch of the film plus the longitudinal dimension of a perforation less the thickness of said claw, whereby reversing the direction of motion of the film does not change the amount of movement of the film during each cycle.

5. In a motion picture apparatus, film actuating mechanism having a definite cycle of movement and comprising an arm having a claw, actuating means for one end of said arm moving said claw into and out of engagement with said film and a cam intermediately engaging said arm and having a portion imparting to said claw a motion equal in length to the film pitch plus the longitudinal dimension of a perforation less the thickness of said claw and having another portion imparting to said claw at intervals during entry into and exit from said perforations a component motion opposite in direction to the motion of the film whereby reversal of film motion without reframing is permitted and scraping of the claw on the film edges is prevented.

6. In a motion picture apparatus, a film guideway, film actuating mechanism having a definite cycle of movement and comprising an arm having a claw which during a portion of the cycle traverses the guideway to engage and move a film therein, actuating means for one end of said arm moving said claw into and out of engagement with the film, a cam engaging said arm and means on the surface of said cam for reversing the direction of said claw with respect to the film movement during entry into the perforations in the film.

7. In a motion picture apparatus, a film guideway, film actuating mechanism having a definite cycle of movement and comprising an arm having a claw which during a portion of the cycle traverses the guideway to engage and move a film therein, actuating means for one end of said arm moving said claw into and out of engagement with the film, a cam engaging said arm and means on the surface of said cam for reversing the direction of said claw with respect to the film movement during exit of said claw with respect to the perforations of the film.

8. In a motion picture apparatus, film actuating mechanism having a definite cycle of movement and comprising an arm having a claw, actuating means for one end of said arm moving said claw into and out of engagement with the film, a cam intermediately engaging said arm and means on the surface of said cam for moving the claw longitudinally of the film a distance equal to the film pitch plus the longitudinal dimension of a perforation less the thickness of said claw.

9. In a motion picture apparatus, film actuating mechanism having a definite cycle of movement and comprising an arm having a claw, actuating means for one end of said arm moving said claw into and out of engagement with the film and a cam intermediately engaging said arm, having portions adapted to move said claw longitudinally of the film and having other portions adapted to impart to said claw a component motion opposite in direction to the film motion at intervals during entry and exit of said claw.

10. In a motion picture apparatus, film actuating mechanism having a definite cycle of movement and comprising an arm having a claw, actuating means for one end of said arm moving said claw into and out of engagement with the film, a triangular cam eccentrically mounted and engaging said arm, and means on the surface of said cam for reversing the direction of said claw with respect to the film movement during entrance and retraction of said claw into and from the film.

11. In a motion picture apparatus, a film guideway, film actuating mechanism having a definite cycle of movement and comprising an arm having a claw which during a portion of the cycle traverses the guideway to engage and move a film therein, actuating means engaging one end of said arm and moving said claw into and out of engagement with said film and a cam eccentrically mounted, intermediately engaging said arm and having a portion adapted to move said claw at intervals in a direction opposite to the film motion during entry of the claw into the film perforations.

12. In a motion picture apparatus, a film guideway, film actuating mechanism having a definite cycle of movement and comprising an arm having a claw which during a portion of the cycle traverses the guideway to engage and move a film therein, actuating means engaging one end of said arm and moving said claw into and out of engagement with said film and a cam eccentrically mounted, intermediately engaging said arm and having a portion adapted to move said claw at intervals in a direction opposite to the film motion during exit of the claw from the film perforations.

13. In a motion picture apparatus, a film guideway, film actuating mechanism having a definite cycle of movement and comprising an arm having a claw which during a portion of the cycle traverses the guideway to engage and lower a film therein, two shafts parallel to the plane of the film and to each other, driving means rotating one shaft twice as fast as the other, actuating means on the slower shaft, engaging one end of said arm and moving said claw into and out of engagement with said film, and a cam actuated by the faster shaft, eccentric with respect thereto, intermediately engaging said arm and having a portion adapted to raise said claw at intervals during exit of the claw from the film perforations.

14. In a motion picture apparatus, a film guideway, film actuating mechanism having a definite cycle of movement and comprising an arm having a claw which during a portion of the cycle traverses the guideway to engage and raise a film therein, two shafts parallel to the plane of the film and to each other, driving means rotating one shaft twice as fast as the other, actuating means on the slower shaft, engaging one end of said arm and moving said claw into and out of engagement with said film, and a cam actuated by the faster shaft, eccentric with respect thereto, intermediately engaging said arm and having portions adapted to lower said claw at intervals during entry of the claw into the film perforations.

15. In a motion picture apparatus, film actuating mechanism having a definite cycle of movement and comprising an arm having a claw, two shafts parallel to the plane of the film and to each other, driving means rotating one shaft twice as fast as the other, actuating means on the slower shaft engaging one end of said arm and moving said claw into and out of engagement with said film, a cam actuated by the faster shaft, eccentric with respect thereto and intermediately engaging said arm and a portion on the surface of said cam for moving said claw longitudinally of the film a distance equal to the film pitch plus the longitudinal dimension of a film perforation less the thickness of said claw.

16. A device of the class described comprising a guideway for a perforated tape, a claw adapted to feed the tape intermittently along said guideway, mechanism reciprocating said claw transversely of the plane of the guideway for moving the claw into and out of engagement with the tape perforations, and means for moving said claw longitudinally of said guideway in one direction for feeding the tape one step, and for partially reversing the movement of said claw immediately prior to its withdrawal from the tape by said mechanism.

Signed at Rochester, New York, this 4th day of October, 1930.

OTTO WITTEL.